(12) United States Patent
Kommer

(10) Patent No.: US 8,005,680 B2
(45) Date of Patent: Aug. 23, 2011

(54) METHOD FOR PERSONALIZATION OF A SERVICE

(75) Inventor: Robert Van Kommer, Villars-sur-Glane (CH)

(73) Assignee: Swisscom AG, Bern (CH)

( * ) Notice: Subject to any disclaimer, the term of this patent is extended or adjusted under 35 U.S.C. 154(b) by 1227 days.

(21) Appl. No.: 11/602,524

(22) Filed: Nov. 21, 2006

(65) Prior Publication Data

US 2007/0124134 A1    May 31, 2007

(30) Foreign Application Priority Data

Nov. 25, 2005  (EP) .................................. 05111345

(51) Int. Cl.
*G10L 15/00* (2006.01)
(52) U.S. Cl. ...... 704/275; 704/251; 704/245; 379/88.01
(58) Field of Classification Search .................. 704/245, 704/251, 275; 379/88.01
See application file for complete search history.

(56) References Cited

U.S. PATENT DOCUMENTS

| | | | |
|---|---|---|---|
| 6,167,377 A * | 12/2000 | Gillick et al. ................. | 704/240 |
| 6,418,431 B1 * | 7/2002 | Mahajan et al. .................. | 707/4 |
| 6,510,417 B1 | 1/2003 | Woods et al. | |
| 6,665,644 B1 * | 12/2003 | Kanevsky et al. ............ | 704/275 |
| 7,099,825 B1 * | 8/2006 | Cook ............................ | 704/251 |
| 7,584,102 B2 * | 9/2009 | Hwang et al. ................. | 704/256 |
| 2001/0021909 A1 | 9/2001 | Shimomura et al. | |
| 2002/0046030 A1 * | 4/2002 | Haritsa et al. ................. | 704/256 |
| 2002/0080927 A1 | 6/2002 | Uppaluru | |
| 2002/0161627 A1 | 10/2002 | Gailey et al. | |
| 2003/0078779 A1 | 4/2003 | Desai et al. | |
| 2004/0098263 A1 * | 5/2004 | Hwang et al. ................. | 704/266 |
| 2005/0033582 A1 | 2/2005 | Gadd et al. | |
| 2005/0091057 A1 | 4/2005 | Phillips et al. | |
| 2008/0162145 A1 * | 7/2008 | Reichardt et al. ............. | 704/275 |

FOREIGN PATENT DOCUMENTS

EP    1 400 953 A1    3/2004

OTHER PUBLICATIONS

C. Lin et al, "Database Management and Analysis for Spoken Dialog Systems: Methodology and Tools", 5th European Conference on Speech Communication and Technology, Eurospeech '97. Rhodes. Greece,. Sep. 22-25, 1997.

* cited by examiner

*Primary Examiner* — Daniel D Abebe
(74) *Attorney, Agent, or Firm* — Pearne & Gordon LLP

(57) ABSTRACT

Method for building a multimodal business channel between users, service providers and network operators. The service provided to the users is personalized with a user's profile derived from language and speech models delivered by a speech recognition system. The language and speech models are synchronized with user dependent language models stored in a central platform made accessible to various value added service providers. They may also be copied into various devices of the user. Natural language processing algorithms may be used for extracting topics from user's dialogues.

39 Claims, 3 Drawing Sheets

METHOD FOR PERSONALIZATION OF A SERVICE

RELATED APPLICATION

This application claims priority of European patent application 2005EP-111345 filed on Nov. 25, 2005, the content of which is hereby incorporated by reference.

FIELD OF THE INVENTION

The present invention relates to a method for personalizing services in a telecommunication network, and to a platform for personalizing services of service providers

DESCRIPTION OF RELATED ART

The success or failure of many services in telecommunication services heavily depends on the personalization of at least some aspects of the service. For example, services using speech recognition algorithms will work better with user dependant speech and language models. Finding and sorting information in search engines, electronic newspapers and other sources of information is more effective if the algorithm takes into account the interests and history of the user. The experience of browsing through a Web shop may be improved with suggestions for articles bought by other users with matching interests.

Therefore, there is a need for many service providers, including the telecommunications operators, to build and to maintain user profiles with always more information about the interests, preferences and habits of each user. In many existing systems, information in the user profiles is learned from questionnaires, which most users find cumbersome to fill in, and from user behaviour.

U.S. Pat. No. 6,687,696 describes a system and a method for personalized filtering of information and the automated generation of user-specific recommendations, wherein the filtering and the generation of recommendations depend on a statistical, semantic model of each user. The user model is learned based on user data retrieved from questionnaires or implied through observing user behaviour such as Internet history logs, demographic information and so on. Other uses of the algorithm for services other than filtering of information and generation of recommendations is not suggested. Furthermore, while this solution may be appropriate for personalizing services to users of personal computers, it is less appropriate for personalizing services offered to users of phone equipments and other devices wherein most user interactions are made with the voice.

According to the invention, an aim of the invention is to provide a new method and system for personalizing services in a telecommunication network which is better adapted to users of phone equipments and other speech-controlled devices.

Another aim of the invention is to provide a new method and system for personalizing services in a telecommunication network which is adapted to a large variety of services, including services provided by external service providers.

Another aim of the invention is to create a new communication stream between a user and an external service provider, wherein the user may benefit from an improved quality of interaction with his device and requested services, and possibly from further incentives, and wherein the service providers, including the telecommunications operator, may benefit from an improved commercial efficiency.

Another aim of the invention is to create a multimodal business channel between users, service providers, and network operators.

BRIEF SUMMARY OF THE INVENTION

According to the invention, these aims are achieved among others by means of a method in a communication network for personalizing a service, comprising the step of
generating user dependent language models by a speech recognition system,
storing said user dependant language models,
making said user dependant language models, and/or a user profile derived from said user dependant language models, available to an application running in a user's device and/or available to external service providers, for personalizing an aspect of a service (4) unrelated to speech processing.

This has the advantage that the personalization of the service depends not only on what is written or read by the user, but also on what the user says or hears. The method may thus be used with devices which are used or commanded mainly by voice, for example hand devices lacking a complete keyboard.

According to another aspect of the invention, the user dependent models adapted by the speech recognition system, and/or the user profile derived from those models, are made available to a plurality of external value added service providers. Thus, the personalized profiles built with the inventive method will not only benefit to the system or entity gathering the speech material from the user, but also to external service providers.

According to yet another aspect of the invention, a multimodal interaction space is permanently opened on the user end device and, possibly, on a synchronised Web service. This interaction space may be used by various external service providers, for example for displaying or reproducing user dependant advertising and information material, whereas the displayed or reproduced content may depend on the user's profile derived from the user dependant models. Moreover, the multimodal user interface is continuously adapting itself through user interactions and input, so as to improve the quality of speech and handwriting recognition on said interface, to adapt the displayed or spoken content to the user's preferences, and to adapt the interface to user preferences and habits. Finally, personalized interaction models may be used to reinforce user authentication through e.g. biometric user verification.

According to another, possibly independent feature of the invention, user dependent language and speech models are stored in the user's device, and intelligently synchronised with user's dependant language and speech models centrally, and to all intents and purposes permanently, stored in a pervasive platform in a telecommunication network. This combines the advantages of models readily available by the speech recognition system in the user's device, with the advantages of language available outside the device. The centrally stored user dependent language and speech models may then be copied or used in other user's device. Thus, a user who replaces his device, or who uses different devices with speech recognition systems, does not need to train language and speech models with each different device. The language and/or speech models may also be made available to third parties, including external service providers using those models for personalizing their services to the user. In addition, the user dependent models may be updated at any moment from the central, pervasive platform. This mechanism of synchronisation of language and/or speech models stored at two different places may even be used independently from the features of claim 1 of the application.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
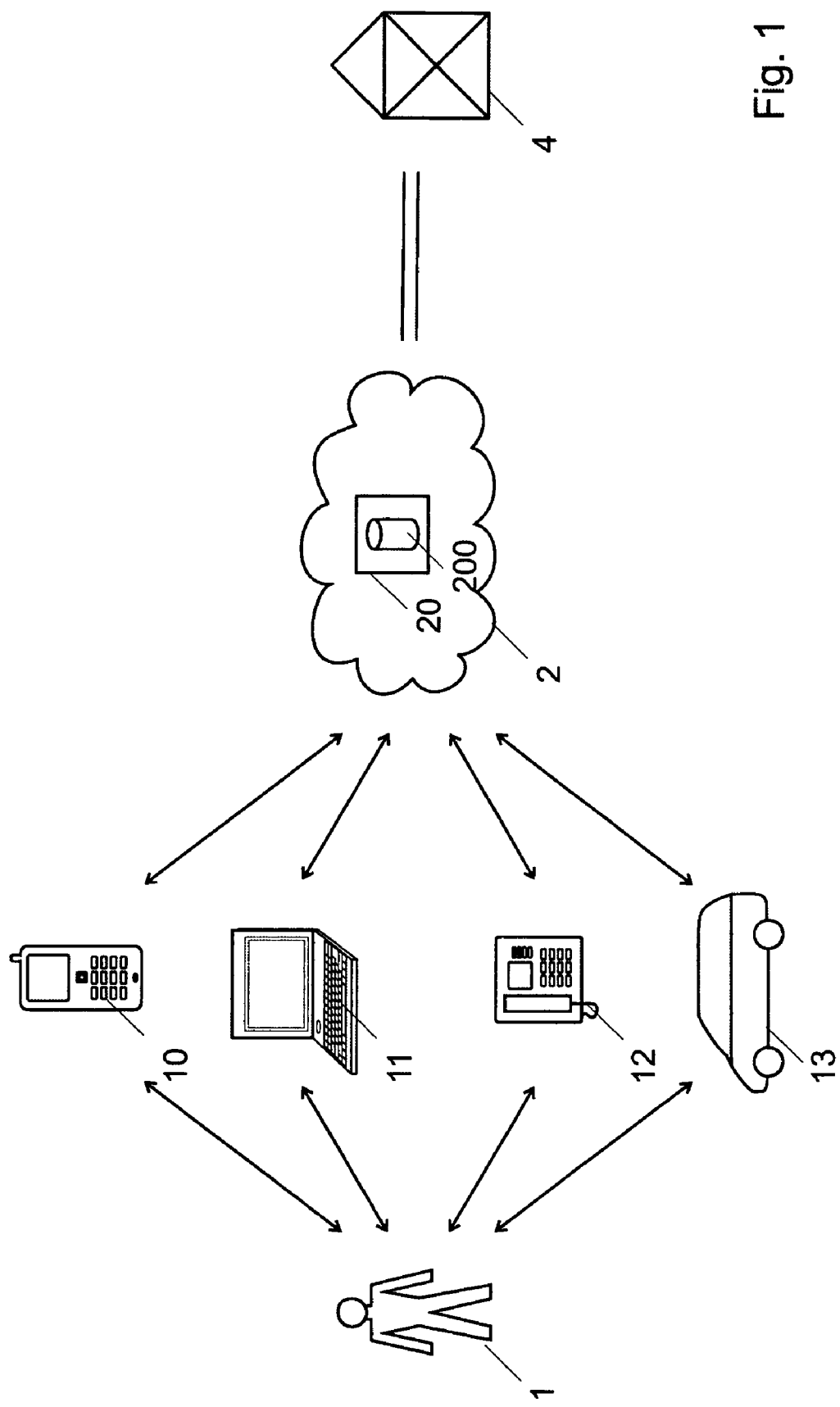
FIG. 1 illustrates in bloc diagrammatic form a telecommunication system in which the method of the invention may be carried out.
Figure 2:
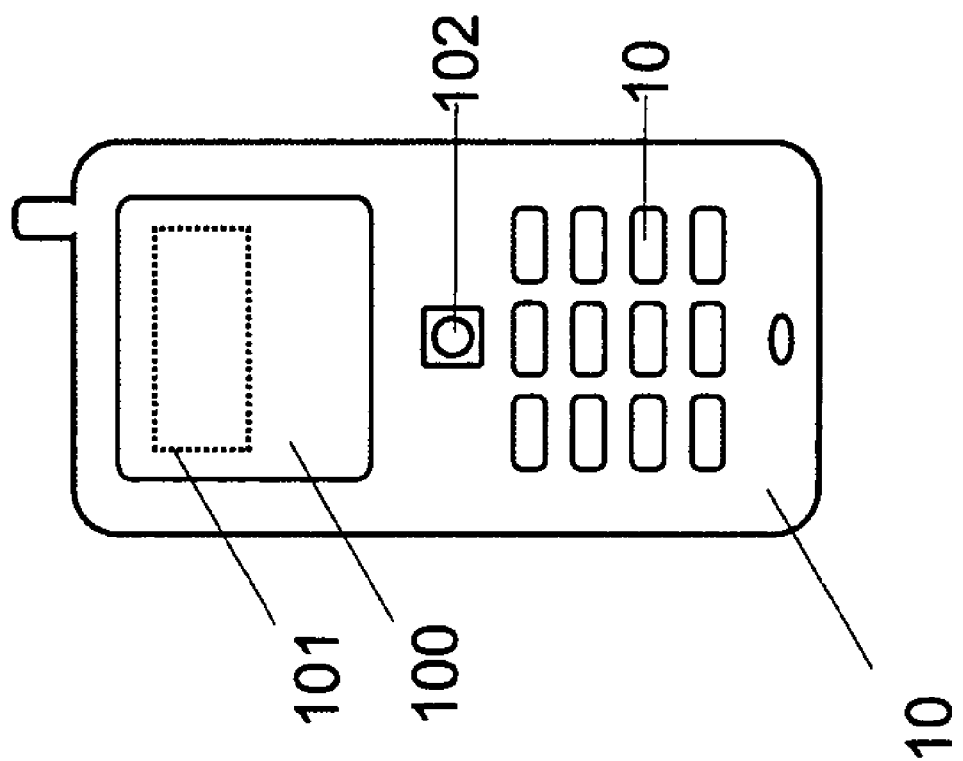
FIG. 2 shows a user device including a multimodal interaction space according to one preferred feature of the invention.

The present invention relates generally to personalizing services in communication networks. Services that may benefit from the invention include for example services provided by external, remote third parties, services of a telecommunication provider, as well as services offered by applications running totally or partly in user end devices. In particular, the present invention relates to the personalization of services using speaker dependant language models adapted by a speech recognition system.

In the context of the invention, the expression "language models" designates a set of models representing the entire language that is to be understood by a speech recognition system. Language models may be described with a grammar; a grammar may be constrained when it does not include each and every possible expression in the speaker language; a constrained grammar thus limits the range of acceptable statements, but is easier to create and may improve the overall speech recognition accuracy by reducing the perplexity. A grammar may be expressed using a set of rules, and/or by listing each and every possible expression that is allowed within the grammar. Absolute or context dependant probabilities may be associated in the grammar (in the language models) with each expression in the list.

The language models needs to be clearly distinguished from the speech acoustic models, i.e. models for the phonemes or triphones of the speech signal. The aim of the language models is only to define expectations about expressions, such as words, groups of words or sentences, that may be spoken at a given stage in a voice dialogue. For example, when the dialogue manager in an automatic directory system prompts the user to enter the name of a city, it will expect the user to answer with an existing city name. The recognition process will thus be dramatically improved by restricting the comparison of the spoken input to city names indicated in a lexicon. For example, if a Viterbi decoder is used for determining the name which has most likely been spoken, the probability of mistakes and the search time will both be reduced if the search is restricted to names existing in the lexicon.

Language models may be created from scratch, using for example a grammar development toolkit, and/or automatically learned and adapted from existing speech material gathered from one speaker, or from a cluster of several speakers. It is also possible to build or buy language models adapted to specific groups of users, for example depending on the profession, age and hobbies of the users. Moreover, it has to be noted that language models used by a speech recognition system are specific to the linguistic origin of the speaker.

Language models may be stored as a data file that contains the set of rules representing the grammar, and/or a data file that contains a table or another data storage structure for storing all expressions and associated probabilities that define the models.

The term "expression" designates in the context of this invention a specific entry in the language models. An expression may be for example a word (unigram), a pair of related words (bigram), such as <the cat>, a trigram (for example "could you please"), and so on. A set of user dependant language models will contain different sets of expressions for each user, and associate different probabilities to each expression. Moreover, the probabilities associated with each expression may depend on the context.

The term "speech recognition system" designates either a combination of hardware and software, or the software alone, that is capable of recognising spoken utterances and detecting known expressions in the utterances.

The term "intelligent synchronisation" designates a mechanism by which sets of data stored at different places are not only replicated, but also adapted, converted or otherwise optimized in at least one place. The set of data stored in the different places may be different.

The term "service provider" or "value-added service provider" designates in this context any entity providing services to users over the telecommunication network, including third parties, the network operator itself, operator of Web servers, call centers, and so on.

The system of the invention comprises one user 1 using one or several user end devices such as, for example, a mobile phone 10, a personal computer 11, a fixed phone 13 and/or any electronic communication equipment 13 in a car for using or accessing various services provided in the end device and/or by remote service providers. At least some of the end devices may include device and/or user identification and authentication means, including for example password entry means, biometric sensors, and/or user identification smart card. In a preferred embodiment, the biometric user identification or authentication is based on speaker speech verification.

Furthermore, at least some devices include a microphone for capturing speech spoken by the users, as well as preferably local speech recognition software for recognizing speech. In a preferred embodiment, at least one device allows for a multimodal interaction with the user, based on a combination of speech with keyboard, keypad or touchpad user entries.

The speech recognition is preferably based on technology such as, for example, hidden Markov models (HMMs) and/or neural networks, and is preferably speaker dependant. In the context of this invention, speaker dependent speech recognition means that the recognition uses speech acoustic models (acoustic models for the phonemes) and language models which depend on each user. In order to improve the interaction speed, the speech recognition is preferably performed locally and based on speech and language models stored locally, i.e. in the user device.

A copy, or a larger set, of the user dependant language, and possibly speech, models may also be provided in a pervasive platform 20 shared by several users and accessed over a communication network 2 such as the Internet. In this case, an intelligent synchronisation mechanism is preferably provided for synchronising changes, additions or deletions in the models in the end device with changes, additions or deletions in the pervasive platform, and/or for removing unused language models from the end device.

In an embodiment, an initial set of language models is first loaded into one user's end device 10, 11, 12 or 13, for example when the user subscribes to the service. The selected language model may be completely user independent, or is preferably dependant on demographic and/or contextual data relating to said user, possibly including data retrieved from questionnaires, and/or on topics semantically extracted from dialogues of said user or from other interactions with his device. Likewise, an initial set of speaker independent, or cluster depend, speech acoustic models, may be loaded into one user's end device 10, 11, 12 or 13.

In an embodiment, the speech and/or language models initially used for the recognition of the speech of a new user are retrieved from other users or from a corpus of users with similar profiles, for example similar accents, similar origins, similar professions, similar demographic profiles, etc. The corpus may also be bought from a third party. In addition, the corpus may be dependant on the context, for example on the applications and services currently or recently used by the user 1, on the date, on the time (different corpus at home or at work), on the location of the user, etc. The speech acoustic models are then adapted with new speech material gathered from the user, using for example the Baum-Welsch algorithm Those initial speech and/or language models are then locally adapted to the user's speech and/or language, using output from the speech recognition system in the user's devices 10, 11, 12, 13. The language models may be completed and adapted for example each time a new expression is spoken by a user. Language models in the user device may also be updated at any time from the pervasive platform, depending for example on the context, and on input from other users. Moreover, unused expressions may be removed from a language model, or from the local copy of the language models.

The language models may then be uploaded into the pervasive platform 2 in order to save them, to copy them into other devices of the user, and/or to make them, to all intents and purposes, permanently available to external service providers and to other user's devices.

It has to be noted that the pervasive platform 20 does not necessarily store an exact replication of the language or speech models in the users' devices. On the contrary, the speakers' dependent models are preferably adapted, converted and/or otherwise optimized in the pervasive platform, for example in order to reduce their storage requirements, or to improve them using knowledge available in the pervasive platform, including possibly knowledge retrieved from models of other users. The pervasive platform thus does not merely act as a repository for the safe storage of speaker dependant language and/or speech models, but processes and/or optimizes the models. We call this process "machine learning" and use the expression "collaborative learning" when knowledge retrieved from other users is used to improve one's models.

The user dependant language models stored in and used by the user's device may furthermore be adapted at any time, possibly just at the beginning of each session requiring speech recognition, with additional language models retrieved from the central platform 20 and/or from service providers. For example, context-dependant language models may be downloaded, depending on the application or service currently used by the user 1, or on topics semantically extracted from recent dialogues or other interactions of the user. In addition, the pervasive platform 20 may possibly also initiate removal of rarely used models, or of models unlikely to be useful for the next sessions.

Likewise, the pervasive platform may initiate updating of the speech models stored in the user's device at any time, for example at the beginning of a session.

In an embodiment, the models are stored as Web services in the pervasive platform 20 and an application, service or agent in the pervasive platform and/or in the user devices ensures that an appropriate subset of those models is stored locally, in the end devices. Different subsets of language models may be stored in the different end devices 10-11 of a same user 1, depending on the available memory and/or on the use made by the user of his end devices. The whole process of synchronisation of language models is preferably transparent for the end user and controlled by the pervasive platform 20. Moreover, this process is preferably free for the user 1, or charged at a flat rate, for example as part of the subscription.

In addition, it may also be possible to upload into the pervasive platform 20 user dependent speech acoustic models, for subsequent use in other user's devices.

The user dependant language models uploaded in the central pervasive platform 20 may furthermore be used for adapting user independent, or cluster dependent language models made available to other users.

Storage of the language models in the pervasive platform 20 may be billed to the user, for example in function of the required volume, frequency of use, etc. In a preferred embodiment, this service is offered as a part of a subscription of the user to the telecommunication network or to a service using those language models. The storage may be independent from any central backup of the user device or of a SIM card in the user device 10, 11, 12, 13, which may also be performed; in particular, synchronisation of the language models in the device and in the central platform 20 is triggered by other events and may arise at different times than any backup of the user's device. Moreover, as already mentioned, language and/or speech models are possibly converted in the central platform 20, and in any case stored in a device independent format, suitable for use in different devices or by different external service providers.

Storage of the user dependant models, or of a copy or superset of those models, in the pervasive platform 2 also allows those models to be used with different end devices of the user. This has the advantage of a faster and better adaptation of the models, since all interactions of the user 1 with any of his devices 10-13 will be used for adapting the models. Furthermore, any user device with a compatible speech recognition system will benefit from the models previously trained with other devices; the user dependant language models thus become pervasive, permanent and independent from any user device.

In a preferred embodiment, the language and/or speech models of a plurality of users are stored in a common pervasive platform 20. In this case, user identification means must be provided in order to associate each connected end device with the matching set of language models. User identification may be based on the caller line identification (CLI), on the international mobile subscriber identification (IMSI) and/or mobile subscriber ISDN (MSISDN) stored in a SIM card in the user's device, on a user identification and/or password entered by the user, on its email or Internet address, and/or on biometric parameters, etc. In a preferred embodiment, the pervasive platform 20 is operated by a public network operator, for example a mobile network operator, and identification of the user if based at least in part on the mechanisms used by this operator for the billing of communications.

Other user dependant data may be associated to each user in the pervasive platform 20, including user dependant acoustic models, user preferences for language, preferred multimodal interaction mode, biometric models of voice, fingerprints, retina, iris, blood vessels, face, etc. A user profile 200 may be derived in the pervasive platform 20 from the user's language models, possibly combined with other data from the same user and/or from different users. In an embodiment, the user's profile comprises for each user a personalized list of semantic expressions, retrieved from the language models and possibly from other user interactions with any end device. User dependent semantic expressions may be gathered for example from utterances of the user when entering commands into his device and when speaking to another party, from utterances of the other party in a conversational dialogue, etc. Furthermore, it may be possible to collect speech material even when the user is not actually speaking into his mobile device; to this end, the microphone and speech recognition system may be switched on even when the user is not speaking into his end device, for capturing and recognizing ambient voices.

The user profile may also simply comprise or consists of a list of words or semantic expressions spoken by the user, possibly combined with a value indicating the absolute frequency of use of each word/expression by the user and/or the frequency relative to other users. Semantic methods and ontologies may be used to add computer-processable meanings to the words or expressions, and/or to classify the words/expressions according to lists of interests or other categories.

The speech acoustic models may also be used to adapt the user profile or to trigger an action; for example, speech models may reveal an accent indicating a geographic and/or socio-demographic origin of the speaker. Other indications that may be retrieved from the speech models include the age, sex, possible illness, emotions, etc of the speaker; those characteristics may also be used by external service providers to personalize their services.

In addition, user dependent semantic expressions may be gathered from any text input by the user in any application run on or initiated by his end device, including word processing, spreadsheet, email or instant messaging client applications, Web log histories, personal user spelling dictionaries, for example, and/or from text displayed to the user for example by his Web browser, email or instant messaging client, etc. An applet or any other software portion in the user's device, in the network 2 and/or by the service providers 4 may be used for extracting this content from the text spoken, written, heard and/or read by the user. In addition, demographic information and information retrieved from questionnaires or Web forms, for example at the subscription of any service of a service provider 4, may be used as a source for gathering semantic content and for defining the user profile.

Different weights may be associated to different sources; for example, it may be considered more important to have a specific expression actually spoken by a user than merely read in a long Web page. In addition, any emotional emphasis to a specific spoken expression, and any style applied to the expression in a document, may be used to evaluate its importance and to weight the expression.

Moreover, the list of user dependent semantic expressions may depend on the time; a specific expression may have a stronger impact on the user's profile if it has been spoken recently. Moreover, any change in the frequency of use of the different expressions may be taken into account; a sudden shift in the frequency of use of any expression may indicate a change in the interests of the user, and trigger an adaptation of the user's profile, an immediate action by a service provider (such as sending of an adapted advertising message), or an update of the language models available in the user's device.

Figure 3:
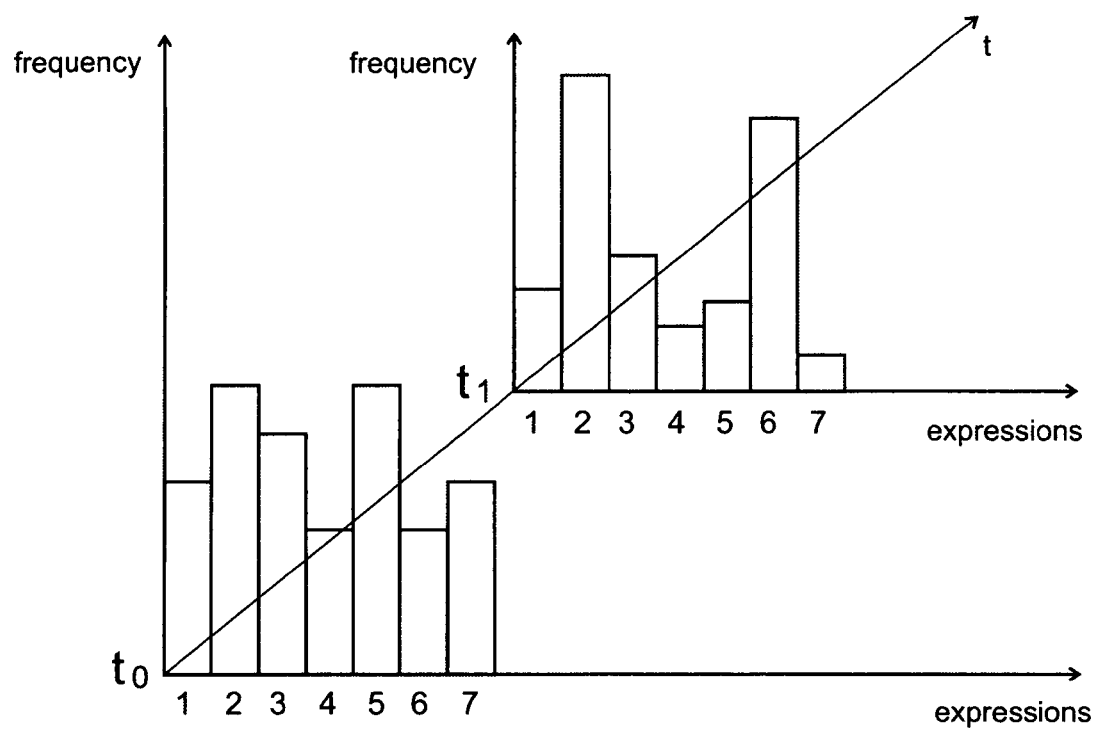
FIG. 3 shows time and user dependant language models.

FIG. 3 illustrates a possible way for storing a user dependant list of semantic expressions. In this embodiment, values are stored that represent the frequency of use of all different expressions 1 to 7 in a list at different instants t0, t1 etc. As indicated, the frequency is a value increased by different weights each time the corresponding expression is spoken, listened to, written or read by the user. The list of FIG. 3 may be stored for example in a database structure, as a comma separated file, as an XML file, etc., in the database 200 and possibly in any user device 10 to 13.

In an embodiment, frequency of use of different expressions at times different from the present are only stored in the pervasive platform 20, whereas only the current language models are stored in the user's device 10, 11, 12, 13. This allows the pervasive platform 20 and the service providers to derive any required information from changes in the language dialogues, while avoiding an unnecessary increase of the storage requirement in the user's device.

The list of expressions stored in the pervasive platform 20 may omit very common expressions, such as "the", "and", "is", etc. and give more importance to rare words and expressions, such as out of vocabulary expressions, and to words conveying a lot of semantic content, including for example proper names, geographical names, than to more common names. Also, large differences in the expression frequency between a user and the remaining users may be taken into account; an expression which is rare for most users, but very frequent in the language of a specific user, may be very useful for establishing the profile of the user and for linking him to groups of other users with known profiles who also use the same expression.

In an embodiment, the pervasive platform 20 (or any other software module run on the end device or by the service provider) executes natural language processing (NLP) algorithms and other algorithms for semantically modelling the retrieved content. The pervasive platform may for example execute semantic topic extraction algorithms for "understanding" the content received, and extracting relevant topics that may be used for example when deciding on the relevant set of language models to use, keep or download, or for determining the profile of the user. Extraction of a specific topic from a user's dialogue may also trigger an event, such as sending of a related advertising message from a service provider.

Ontology methods may be used for clustering or organizing conceptually close expressions; the ontology may be described for example with a graph, possibly in XML format, defining relations between related words. For example, the expression "anti-braking system" is related to "ABS" and, to some extent to car, but much less to other expressions such as "computer" or "banana", for example. Clustering semantically similar expressions allows to better take into account various ways of expressing some concepts and user interests with various expressions. On the other hand, clusters may be used to distinguish between different significations of a particular expression, depending on the context.

Moreover, semantic algorithms may be used for computing the semantic distance between documents or dialogues extracts, for example between user's utterances and reference dialogues stored in the pervasive platform and/or with the service providers. Again, this distance may be used for example for deciding if a specific action should be triggered or if the user's profile should be adapted.

In this embodiment, the user dependent list of semantic expressions is replaced, or completed, by a list of semantic clusters and associated probabilities.

Similarly, the user-dependant list of expressions (including clusters) may take into account different languages spoken or used by a user, and use translations of words or expressions.

As already indicated, the list of semantic expressions of FIG. 3 is made available to various external service providers 4 in order for them to compute user profiles. Profiles retrieved by various providers may be different; in an example, a provider 4 of travel services may watch for end users employing recurrently, in a recent past, expressions such as "skiing", "Matterhorn" or "vacations", whereas a mobile phone seller would try to mine out subscribers with a lot of affinities for technology devices.

In another embodiment, a user profile is retrieved from the lists of semantic expressions, and possibly from acoustic speech models, directly by the pervasive platform 20, and made available to the service providers. This has the advantage that the profile need be computed only once, and that only one software infrastructure is needed for that purpose; the drawback, however, is that information in the profile is not dependent on the service. The pervasive platform may try to categorize users in various categories that may be useful to the various service providers.

In one embodiment, an incentive is offered to the users 1 for their participation in the system and for making available elements of their profile to third parties. This bonus may for example take the form of a bonus, of a reduction in the subscription fee or communication fees for the mobile network and/or for the service, or of liability program points each time the profile is used by a service provider and/or when the service is subscribed.

The list of semantic expressions and/or the profile derived therefrom may be made available to third parties 4 for example as Web services, as a file made available over a Web or FTP server, or pushed to or pulled by a plurality of external or internal (in the platform 20) service providers 4 by any suitable protocol. Availability may be restricted to service providers authenticated in the platform 20 and with which a valid agreement exists; furthermore, a user 1 may decide to restrict the availability of his profile to some external providers only. n an embodiment, access to the whole profile, or to sensitive parts of the profile, is only allowed to service providers explicitly authorised by the user.

As already mentioned, the profile retrieved from the language and speech models delivered by the speech recognition system in any user's device may also be used within the device, or within the user's local area network, for example by any application run by said device or within said local network.

In an embodiment, this information is made available over an anonymizing platform (not shown) that removes any user identifying data from the profiles made available to the third parties, or that replaces this user identifying data with an alias. The anonymizing platform may be run by another party independent from the operator of the pervasive platform 20 and from the service provider 4.

Various kinds of service providers may use the system and method of the invention. In one embodiment, the system is used by a service provider 4 for pushing 1-to-1 personalized advertising and information material to the users' end devices 10, 11, 12, 13. The advertising and informational material may for example be displayed on a multimodal reserved portion 101 of the user's interface 100, for example on a portion of a touchscreen 100. Advertising material may also be played acoustically with the loudspeakers of the user's end device. In a preferred embodiment, informational and advertising material that matches the interests and needs of the user is selected by a service provider 4 according to the user's profile in the database 200, and pushed to the user's device for example as Web pages or Web services, for example over a GPRS, EDGE, UMTS, or any suitable, "always on" communication channel.

The multimodal portion 101 is preferably also always on, i.e. it may display and possibly play still pictures, videos and/or sounds even when the user's device 10 is not in use. The user 1 preferably has the possibility to deactivate the service for example during meetings; some incentive, as described above, may be offered to incite them to activate the service as often as possible.

The multimodal reserved portion 101 preferably allows the user to react to a message received, preferably using various modes. The user 1 may for example type an answer on the keypad 103 of his device, and/or select or write directly on the touchscreen 100, and/or enter commands with his voice. In a preferred embodiment, handwriting recognition and/or speech recognition is performed using user dependent models that may be preferably stored centrally, in the database 200, and possibly synchronised with local models. The handwriting and/or speech recognition process itself may be performed in the user's device 10-13 and/or remotely, in the pervasive platform 20 or by the service provider.

Furthermore, it may be possible to identify or at least to authenticate the user 1 using biometric features, including fingerprints gathered when manipulating the touchscreen 100 or any other haptic element 102, and/or speech features. Again, user identification/authentication may be based on user models of voice, fingerprints or other user features stored in the user profile in the database 200, and possibly synchronised with user models in the end device. The identification/authentication process itself may be performed in the user's end device, in a chip card inserted in the device, in the pervasive platform 20 and/or on the service provider's side 4.

We will now describe an example of interaction between user 1 Alice, her telecommunication operator FreeCom and several value added service providers.

For several years, Alice has been using multimodal interaction on her phone. Her multimodal interaction models, used for recognizing her voice and handwriting, and for identifying or authenticating her, are working fine even in the usually noisy environment. Typically, she is dictating SMS or booking last minute travel arrangements. In some recent SMS, Alice was talking about the Caribbean Islands. A travel agency 4 has an agreement with her network operator FreeCom to get access to the customer profile of Alice as well as of many other customers. Since the language model has been recently adapted towards Caribbean Islands, the travel agency decided to automatically issue an offer with several alternatives. Alice receives that multimodal advertisement: first a sweet music from the Caribbean Islands is ringing, followed by a multi-choice form displayed on screen. Alice decided to purchase a travel arrangement by using the multimodal purchase feature; she selects with the pen, utters "I wish to purchase this offer", and her voice is used as a signature together with the already known identity of Alice.

More specifically the dialog could look like this:

A service provider decides to joint the subscription model with 1 to 1 new multimodal business channel offered by a telecommunication operator FreeCom running a pervasive platform 20. The service provider 4 thus registers its service and the service of the service provider 4 is recorded on the pervasive platform 20, with the following features:
1. Access is granted to all the subscribers' meta-data.
2. The language models necessary for the multimodal access to the service provider 4 are updated (this further occurs on a daily basis)
3. Credits management is agreed (e.g., Revenue sharing model.)
4. The semantic pattern matcher is communicated for event generation.
5. The billing address and transaction procedure are defined.

Alice then fills in a subscription form with the network operator FreeCom to gain incentives, for example access to free mobile communication. In exchange, she agrees to give away her profile to a selection of third parties (She could select in a list some of them). Many other interaction settings are also defined at this stage to improve the service offer of FreeCom.

The interactive multimodal environment is initialized by the service provider with personalized interaction models directly on the given end-devices. This configuration may be uploaded on several other end-devices 10, 11, 12, 13 (PC, other phones).

The pervasive platform 20 uploads the multimodal interaction environment on the end-device of Alice including best matched models, language models (including the new language models of the service provider), and other third party applications.

A dictation SMS application is activated by Alice on her end device. This application uses the personalized models (acoustic and language). Both models are continuously adapted to Alice's voice and text input.

Synchronization transparently occurs with the pervasive platform. The service provider gains access to the new information provided by the updated language model through the Web Services. Alternatively, since the Caribbean Islands concept was used by Alice and detected, an event (semantic pattern hit/topic detection) is generated and sent to the service provider.

The service provider gets the event and searches a possible match with the list of Last minute offers. A match is found, the application is prepared and pre-loaded on the end-devices of Alice. In an embodiment, new language models, including expressions that may be required for accessing the offer of the service provider, are uploaded into Alice's device. The language models may also update the probabilities associated with already available expressions, in order to anticipate expected answers.

A multimodal information/advertisement java or HTML object is then pushed and displayed on Alice's end-device 10. The necessary language models needed to activate the session are previously synchronized through the pervasive platform 20.

On the reserved multimodal interaction portion 101, a Caribbean music sound announces the arrival of an advertisement. On screen, a list of potential last minute choices is displayed. All main language models are uploaded to make the user experience as pleasant as possible, and without interaction latency.

A mixed initiative multimodal dialogue is issued where Alice could choose various options on-the-fly while she is purchasing a travel arrangement in the list. Alice points with a pen on her preferred choice in the displayed menu and says "I'll take that one with a double room and please charge it to my FreeCom account". The service provider 4 receives the order through a purchase event. A live agent of a call center is possibly activated if necessary.

An e-ticket for the last minute flight is issued by the service provider and then loaded on the end-devices of Alice. Simultaneously, a bonus credit is added for Alice. The pervasive platform 20 updates the interest of Alice within her meta-data. The network operator performs the payment and takes a percentage on this transaction.

The system and method of the invention could be used for other kinds of services of external providers, including but not limited to:

Partner pairing, for automatically detecting possible partners that share similar or compatible profiles as determined, at least in part, from the language models adapted by a speech recognition system.

Personalized delivery of information; personalized newspapers, depending on interests derived from said language models.

Personalized ranking of search results, whereas the order of documents retrieved for example by a search engine depends on the profile of each user, derived from what the user says, hears, writes and/or reads.

Automatically refining an existing search result, in order to keep only the documents that best match the user's interests and profile.

Automatic selection of audio, video and/or text content sent in stream mode to the user's device, for example automatic selection of music played to the user.

Automatic selection of products and services proposed to the client, depending on what the user said and what users with similar profiles in the database 200 have selected, reviewed or purchased.

Filtering out spam messages that do not match the interests and usual expressions of said user.

Auction services, wherein new offers that may match the user's interest as retrieved from his language and speech models is proactively pushed to the multimodal space 101 of his end devices 10-13.

Notepad, allowing the user to search in the history of semantic expressions he used or heard, for example during a specific time window, so as to help him remember the name of a person, place, etc.

Central backup of language models, as well as of other data stored in the pervasive platform 20, in a format preferably independent from the end devices, thus allowing the user to use those trained models with new devices.

Personalized assistance to a call center, taking into accounts the history of voice and multimodal interactions of the user.

The invention thus allows to build a real multimodal business channel between the users on one side, service providers on the others side, and the network operator.

The invention claimed is:
1. A method in a communication network for personalizing a service, comprising the steps of:
   generating user dependant language models by a speech recognition system,
   storing said user dependant language models,
   making said user dependant language models, and/or a user profile derived from said user dependant language models, available to a software application running in a user's device and/or available to external service providers, for personalizing an aspect of a service unrelated to speech processing, using a microphone of a user end device of said user for gathering ambient speech material outside normal use of said user end device for voice or data communications with external devices, and using said ambient speech material for adapting said user dependant language models.

2. The method of claim 1, wherein at least a subset of said user dependant language models is stored locally in a user device and synchronised with user dependant language models stored in a pervasive platform.

3. The method of claim 2, further comprising a step of performing speech recognition in said user device using said locally stored user dependant language models, wherein said aspect of a service is personalized using said centrally stored user dependant language models.

4. The method according to claim 2, further comprising the steps of:
loading into said user device an initial set of language models,
adapting said language models to said user,
synchronising said adapted, user dependant language models with said centrally stored user dependant language models, and
downloading said centrally stored user dependant language models into another device of said user.

5. The method according to claim 2, further comprising the steps of:
loading into said user device a set of language models that depends on the demographic and/or contextual data relating to said user, and/or on topics extracted from dialogues of said user,
adapting said language models in said user device, and
uploading said adapted language models into said platform.

6. The method according to claim 2, wherein previous versions of said user dependant language models are stored in said pervasive platform.

7. The method according to claim 1, further comprising the steps of:
gathering speech material related to the activities of the user,
performing speech recognition on said speech material, said speech recognition step comprising a step of adapting user dependant speech recognition language models,
retrieving from said user dependant speech recognition language models information used for adapting a user profile,
using said user profile for personalizing said service.

8. The method according to claim 7, comprising a step of making elements of said user profile and/or of said language models available in the Internet as Web services.

9. The method according to claim 1, further comprising a step of establishing a user dependant list of semantic expressions retrieved from speech material related to the activities of the user, and using said list for adapting said user profile.

10. The method according to claim 9, wherein said semantic expressions comprise at least one of the following:
words,
bigrams, trigrams and/or n-grams, and/or
semantic clusters and/or ontologies.

11. The method according to claim 9, further comprising a step of determining the frequency of use of said semantic expressions by said user and adapting said user profile according to said frequency.

12. The method according to claim 9, wherein said user profile depends on the time at which said semantic expressions have been gathered or spoken.

13. The method according to claim 9, wherein said user profile depends on the rareness of said semantic expressions and/or on the context when they were retrieved.

14. The method according to claim 1, further comprising the step of gathering in a remote speech server speech material spoken by a user when accessing said remote speech server.

15. The method according to claim 1, further comprising the step of gathering in a user end device speech material spoken by a user when speaking into said user end device.

16. The method according to claim 1, further comprising the steps of:
gathering speech material of said user during normal phone conversations with other users or devices, and
using said speech material for adapting said user dependant language models.

17. The method according to claim 1, further comprising the step of gathering non spoken semantic expressions entered on a keyboard or keypad by said user and/or displayed to said user, for example during multimodal interactions between said user and said device, and using said non spoken semantic expressions in addition to expressions recognised by said speech recognition system for said step of personalizing.

18. The method according to claim 17 wherein said non spoken semantic expressions include words and are at least partly gathered from Internet history logs, visited web pages, word processor applications, and/or e-mail client applications.

19. The method according to claim 17, wherein at least some of said non spoken semantic expressions include words that are retrieved from a personal word spelling dictionary.

20. The method according to claim 1, further comprising the step of making said user dependant language models available to a plurality of speech recognition systems in a communication network.

21. The method according to claim 1, wherein anonymized user profiles are made available to external value added service providers.

22. The method according to claim 1, wherein user profiles are only made available to external value added service providers authorised by said user.

23. The method according to claim 1, wherein said step of personalizing an aspect of a service includes sending of personalized advertising messages to said user.

24. The method according to claim 23, wherein said advertising messages are displayed on a multimodal reserved portion of a user's device.

25. The method according to claim 24, wherein new messages are sent to said user device even outside communications initiated or answered by said user.

26. The method according to claim 23, further comprising the step of giving to said user an incentive for receiving said advertising messages.

27. The method according to claim 24, wherein said user may answer directly said advertising message by speaking and/or clicking and/or writing on said multimodal portion.

28. The method according to claim 27, further comprising a step of authenticating said user with his voice and/or with his fingerprint and/or with handwriting when he answers said advertising message.

29. The method according to claim 1, wherein said step of personalizing an aspect of a service includes proposing to said user names or addresses of users with matching interests or profiles.

30. The method according to claim 1, wherein said step of personalizing an aspect of a service includes selecting information matching the interests of said user.

31. The method according to claim 1, wherein said step of personalizing an aspect of a service includes ranking search results according to user criteria.

32. The method according to claim 1, wherein said step of personalizing an aspect of a service comprises filtering out spam messages.

33. The method according to claim 1, further comprising the step of using user dependant speech acoustic models delivered by said speech recognition system for personalizing said aspect of said service unrelated to speech processing.

34. A method used in a communication system for building a user profile with information about the interests and/or habits and/or preferences of the user, said method comprising the steps of:
  generating user dependant language models by a speech recognition system,
  deriving a user profile from said user dependant language models, and
  providing a communication interface for transmitting at least a portion of said user profile to a provider computer.

35. A method used in a communication system for building a centrally stored user profile with information about the interests and/or habits and/or preferences of the user, said method comprising the steps of:
  generating user dependant language models by a speech recognition system in a user device,
  deriving a user profile from said user dependant language models,
  synchronising said user dependant language models and/or user profiles with a central database of language models and/or user profiles remotely stored in a server, and
  providing a communications interface for providing access to said language models and/or user profiles by external service provider computers for personalising services to the users.

36. A communication system in a communication network comprising:
  a speech recognition system for generating a plurality of user dependant language models;
  means for storing said user dependant language models; and
  a communications interface for providing an external service provider and/or an application running in a user's device access to said user dependant language models, and/or a user profile derived from said user dependant language models for personalizing an aspect of a service unrelated to speech processing.

37. A method in a communication network for personalizing a service, comprising the steps of:
  generating user dependent language models by a speech recognition system,
  storing said user dependent language models;
  deriving from said user dependent language models a personalize list of semantic expressions; and
  providing a communications interface for making at least a portion of said list available to an application running in a user's device and/or available to external service providers for personalizing an aspect of a service unrelated to speech processing.

38. A communication system in a communication network comprising:
  a speech recognition system for generating a plurality of user dependent language models;
  means for storing said user dependent language models;
  means for deriving from said user dependent language models a personalized list of semantic expressions; and
  means a communications interface for providing an external service provider and/or an application running in a user's device access to receive at least a portion of said list for personalizing an aspect of a service unrelated to speech processing.

39. A method in a communication network for personalizing a service, comprising the steps of:
  generating user dependent language models by speech recognition system,
  storing said user dependent language models in a platform,
  providing an interface to said communication network for making said user dependent language models and/or a user profile comprising for each user a personalized list of semantic expressions derived from said user dependent language models available over a communication network to an external service provider, and
  using said user dependent language models and/or user profile for personalizing a service provided by said external service provider.

* * * * *